United States Patent [19]

Garrison

[11] 4,111,991

[45] Sep. 5, 1978

[54] PROCESS FOR MAKING HALOGEN SALTS

[75] Inventor: James A. Garrison, Huntington Beach, Calif.

[73] Assignee: Deepwater Chemical Co., Costa Mesa, Calif.

[21] Appl. No.: 797,419

[22] Filed: May 16, 1977

[51] Int. Cl.² .................................................. C07C 87/22
[52] U.S. Cl. .............................. 260/583 P; 260/579; 260/583 R; 423/491; 423/497; 423/499
[58] Field of Search ....... 260/583 P, 583 G, 583 GG, 260/579, 583 NH, 583 R; 423/351

[56] References Cited

U.S. PATENT DOCUMENTS

| | | | |
|---|---|---|---|
| Re. 21,528 | 8/1940 | Fisk | 260/583 P |
| 2,128,741 | 8/1938 | Fisk | 260/583 P |
| 2,211,837 | 8/1940 | Rice et al. | 260/583 P X |

FOREIGN PATENT DOCUMENTS 930,499  7/1963  United Kingdom .................... 423/351

*Primary Examiner*—O. R. Vertiz
*Assistant Examiner*—Thomas W. Roy
*Attorney, Agent, or Firm*—George F. Bethel; Patience K. Bethel

[57] ABSTRACT

A process for making halogen salts which comprises reacting elemental halogen, hydrazine or a hydrazine compound, and a compound selected from the oxides and hydroxides of alkali metals, alkaline earth metals, Zn, Bi, Sn(II,IV), and Mn(II), the carbonates and bicarbonates of the alkali metals, alkaline earth metals, Sc, Y, Ti(IV), Zr, Hf, V(IV), Nb, Ta, Mn(II), Fe(II), Co(II), Ni, Cu(I), Ag, Zn, Cd, Hg(II), Al, Ga(III), Tl(III), Sn(II,IV), Pb(II) and Bi and the hydrates thereof, ammonia and ammonium compounds, such as ammonium carbonate, amines such as ethylenediamine, in the presence of a solvent medium selected from water, alcohols, ethers, and mixtures thereof. Thus, lithium carbonate, hydrazine, and elemental iodine react in water to produce lithium iodide which can be isolated from the water solution by evaporation.

12 Claims, No Drawings

PROCESS FOR MAKING HALOGEN SALTS

BACKGROUND OF THE INVENTION

1. Field of the Invention

This invention relates to the field of halogen salts, and particularly to a novel method for producing iodine salts, including, for example, metal iodides, ammonium iodide, and ethylenediamine dihydriodide which are difficult or expensive to make by prior art methods.

2. Description of the Prior Art

Halogen salts have long been used for a myriad of useful purposes, such as analytical reagents, medicines, mordants, photography, single crystals for spectroscopy, feed additives and cloud nucleation. Many pure metals will react directly with halogens to form the corresponding halogen salts. However, the cost involved in obtaining metals in their elemental form have made this process economically impractical. Thus, methods were sought which would permit reaction between metals in the form of metal salts and elemental halogens.

Of the halogens, fluorine, chlorine and bromine are more reactive than iodine. As a consequence, their salts are more easily formed from the elemental state than is possible with iodine. Until recently, several steps were required for the production of many iodide salts. This is particularly true in the case of alkali metal iodides which are commonly produced from ferrous iodide and alkali metal hydroxides in a two step process.

According to one process for producing potassium iodide, potassium hydroxide is reacted with elemental iodine in the presence of water. Both potassium iodide and potassium iodate are produced by this process. In order to remove the undesired potassium iodate from the potassium iodide, the mixture is subjected to fusing at high temperatures. This causes the potassium iodate to thermally decompose before the potassium iodide.

Recently, a method of producing lithium and other alkali metal iodides was set forth in U.S. Pat. No. 3,402,995. This process utilizes an alkali metal hydroxide, elemental iodine and hydrogen sulfide in a water solvent to produce the corresponding alkali metal iodide, sulfur and water. The sulfur is precipitated and must be removed by filtration or other methods before the alkali metal iodide can be isolated by evaporation.

The above described reaction, while more effective than prior art methods, requires removal of the sulfur from the final product. The use of hydrogen sulfide is also undesirable due to its toxicity and flammability. As a consequence, elaborate precautions must be taken in order to protect the personnel involved in making the iodide, as well as to prevent any contamination of the atmosphere.

Also, the method disclosed in the above mentioned patent is stated only to be useful for production of alkali metal iodides. Other iodide salts, including amine iodide salts such as ethylenediamine dihydriodide are not mentioned.

Ethylenediamine dihydriodide, which is widely used as a feed additive and in medicine, can be made by a method which is described in U.S. Pat. No. 2,128,741. The compound is produced by reaction between aqueous solutions of ethylenediamine and hydriotic acid.

The above method for producing ethylenediamine dihydriodide does not include reaction of ethylenediamine with elemental iodine. A separate step, then, is required to make the hydriodic acid from the elemental iodine.

SUMMARY OF THE INVENTION

The disadvantages of the above described methods have now been overcome by the present invention which allows for the production of metal iodides, including alkali metal iodides, alkaline earth metal iodides, and certain other metal iodides, as well as amine iodides, such as ethylenediamine dihydriodide and ammonium iodide by a method which employs elemental iodine in a one step process.

According to the invention, elemental iodine is reacted with a metal salt, for example, potassium carbonate, and hydrazine hydrate in the presence of water to produce the metal iodide, in this case potassium iodide. Water, carbon dioxide, and nitrogen gas are also produced. The metal iodide, thus formed, is in a water solution which can be isolated by evaporation.

The same process is followed to produce ethylenediamine dihydriodide by substituting ethylenediamine for the metal carbonate.

The reaction briefly described above is simpler, safer and less expensive than prior art processes. Reaction is instantaneous in an open vessel. Cooling of the reaction is desirable but not necessary. Agitation of the reactants is not necessary but desirable, particularly with difficulty soluble reactants. In addition, isolation of the product is quite easy, since other reactant products escape as non-toxic gases.

While other solvent systems can be used, water is the most preferred and therefore allows for significant cost savings.

The exact manner of adding the reactants to the reaction vessel is not critical, although certain methods are preferred over others. This allows for a wide range of flexibility in producing the various compounds which are covered by the invention.

According to the preferred method, a water solution or dispersion of the metal salt or equivalent is added to the reaction vessel followed by the alternate charging of aliquot or incremental amounts of the elemental iodine and the hydrazine, preferably in the form of hydrazine hydrate.

Also, while the invention is most particularly suited for the production of the iodide, it is equally well suited to the production of other halogen salts, by substitution for the elemental iodine. It can be appreciated, however, that in such instances, other known methods might be preferred or less expensive to produce salts with other halogens, even though the present invention can be used to produce such salts.

DETAILED DESCRIPTION OF THE INVENTION

The process of the invention comprises the steps of reacting substantially stoichiometric amounts of the reactants. The reactants include three compounds. The first compound is elemental halogen. This would include fluorine, chlorine, bromine, iodine and astatine. It will be apparent that astatine, being radioactive, would not normally be suitable from a practical viewpoint, since its half life is so short, 8.3 hours for astatine 210, However, it could be used.

In the case of fluorine and chlorine which are in gaseous form, it would be necessary to bubble the gas into the reaction mixture. Bromine being a liquid could be easily added to the reaction vessel.

Iodine in its elemental form is a solid at room temperature. Preferably, for the purposes of this reaction, it should be in a finely divided form to permit even reaction rates. In fact, large lumps would not at all be desirable and could result in very rapid reaction rates.

While the fluorine, chlorine, and bromine would most likely be in a very pure form, it can be appreciated that iodine, being in a solid form, is sometimes contaminated with other materials. While it is not necessary that the iodine be absolutely pure, any contaminant which is present in the elemental iodine will most likely also be a contaminant in the final product. Therefore, it is preferred to use highly purified iodine for best results.

The second reactant is hydrazine or a compound which generates hydrazine under the conditions of the reaction. Examples of hydrazine compounds which can be used in place of hydrazine include among others: hydrazine sulfate, hydrazine acid tartrate, hydrazine hydriodide, hydrazine hydrochloride, and hydrazine hydrobromide.

The major requirement for the hydrazine compound is that it generate hydrazine under the conditions of the reaction. In some instances, the salt of which the compound is formed, will be present as an impurity in the final product.

Also, while hydrazine compounds can be used, hydrazine hydrate is the compound which is most preferred. Hydrazine is available in an anhydrous state, which can be used but is not preferred for use in this process.

Rather, it is preferred for safety and ease in handling, to use hydrazine in the form of a solution with water. Commercially available hydrazine-water mixtures or solutions contain approximately 64% by weight, 54% by weight, and 35% by weight of hydrazine. The 64% by weight solution is formed from a 1:1 mole ratio of hydrazine and water. Greater amounts of water are present in the other solutions. All of the above have given excellent results. The 35% by weight hydrazine solution in water is most preferred, due to its lack of a flash point.

The third compound which forms a reactant is a compound which ultimately combines with the elemental halogen in the final product. This compound includes metal salts as well as ammonia and ammonium compounds and amines as subsequently discussed.

Of the metal salts there is included the oxides and hydroxides of alkali metals, alkaline earth metals, Zn, Bi, Sn(II,IV), and Mn(II); the carbonates and bicarbonates of alkali metals, alkaline earth metals, Sc, Y, Ti(IV), Zr, Hf, V(IV), Nb, Ta, Mn(II), Fe(II), Co(II), Ni, Cu(I), Ag, Zn, Cd, Hg(II), Al, Ga(III), Tl(III), Sn(II,IV), Pb(II) and Bi. Hydrates of the above materials are also intended to be included in the term "metal salt". Mixtures of the above salts can be used if desired using the same or different metals. In the latter instance, both metal halides will be produced.

In addition to the above, ammonia can also be used to form the ammonium halides. The gas can be used as well as aqua ammonia, which is a solution of ammonia and water. Aqua ammonia is also known as ammonium hydroxide and ammonium hydrate. Other compounds which generate ammonia under the reaction conditions include among others: ammonium carbonate, ammonium bicarbonate, and ammonium carbamate.

Amines can also be used to form the corresponding halides. While any amine can be used, those which have a base strength which is weaker than hydrazine will not give quantitative results as the hydrazine then competes for the halide.

As mentioned above, the reaction is particularly suited to the production of ethylenediamine dihydriodide from ethylenediamine and iodine. Salts of the ethylenediamine can also be used as long as they generate the amine under the reaction conditions. Examples of such compounds include among others, ethylenediamine hydrochloride, ethylenediamine sulfate and ethylenediamine tetracetic acid. The pure amine is preferred in every case over the salts as contaminants are introduced into the final product through their use.

Other amines can also be used in the process of the invention. Examples include among many others: methylamine, ethylamine, propylamine, dimethylamine, diethylamine, trimethylamine, benzylamine, and N', N-diethylethylene diamine.

Mixtures of the above compounds forming the third reactant can be used to form complex compounds as $HgI_2 \cdot CuI$ used in thermoscopy.

The reaction takes place in a reaction medium or solvent which is selected from the group consisting of water, alcohols and ethers such as dioxane. The term "alcohols" is intended to include polyols such as ethylene glycol and glycerol. Mixtures of the above materials can also be used. Of the above, water is most preferred due to its low cost and availability.

The exact amount of water or other solvent is not critical. Preferably there is sufficient water or other solvent to provide ease in the mixing of the ingredients, as well as to absorb any excess heat which might be evolved. Excellent results have been obtained using about ten moles of water for every mole of halogen.

While extremely dilute solutions can be used, it can be appreciated that such use will slow down the rate of reaction due to the distance between the molecules. This can be resorted to, if desired, but from a practical standpoint, there is little advantage to it. Also, large amounts of water present in the reaction mixture will ultimately have to be removed in order to separate the halogen salt produced by the reaction. This requires additional input of energy if evaporation is used to separate the product. This leads to increased costs for the process.

The process of the invention is believed to react according to the following equation, using as examples calcium salts, iodine and hydrazine as the reactants and water as the reaction medium or solvent:

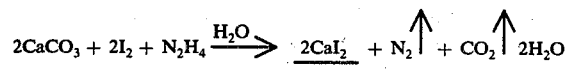

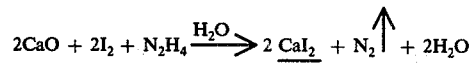

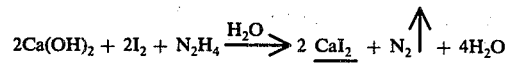

Amines such as ethylene diamine, and ammonia are believed to react with iodine and hydrazine in water according to the following equations:

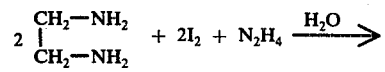

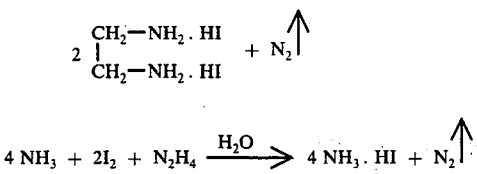

$$4 NH_3 + 2I_2 + N_2H_4 \xrightarrow{H_2O} 4 NH_3 \cdot HI + N_2\uparrow$$

Other reactants, including other halogens are believed to react in the same way.

It has been found that best results are obtained when the pH is kept in the range of about pH 3 to about pH 14. When the pH drops below about 3, the reaction slows down and may even stop. Therefore, for best results, the preferred pH range is from about pH 4.5 to about pH 7.5. The pH of the reaction mixture can be controlled by the method of addition of the reactants as subsequently explained.

For example, it is preferred to use substantially stoichmetric amounts of all the reactants. These can be mixed simultaneously if adequate stirring and cooling is provided. This method is not recommended, however, since there will be localized concentrations of reactants which may cause forceful reaction and possibly foaming over with loss of product.

The method of mixing the reactants which is most preferred includes suspending or dispersing the metal salt or equivalent such as the amine or ammonia compound in the solvent medium. To this is then added aliquot amounts of the total amount of the hydrazine alternately with aliquot amounts of the total amount of elemental halogen which has been calculated to react.

For example, using aliquots of about 10% of the hydrazine and about 9% of the halogen added slowly to prevent excess gas and heat has given excellent results. This method maintains a slight excess of hydrazine. Maintaining a slight excess of halogen also gives good results.

When too little of the metal salt or equivalent is present in the reaction medium, the pH tends to drop which may slow or stop the reaction. Too great amounts of the salt or equivalent will raise the pH and possibly cause solids to be present due to the possible insolubility of the salt at a high pH.

The pH of the reaction mixture is reduced as the amount of the halogen is increased. By contrast, the amount of the hydrazine which is present tends to have an effect of raising the pH. By balancing the amounts of the metal salt, the halogen, and the hydrazine in the manner suggested, the pH can be kept in the preferred range of approximately 4.5 to about 7.5.

The above is often easily accomplished without testing since the reaction mixture has a color change when the amounts of the reactants are varied. For example, in the case of iodine, an excess of hydrazine produces a clear solution. With increasing amounts of iodine, this turns to a reddish color or blush. The reaction can be controlled by adding a sufficient amount of hydrazine to just eliminate the red color to a blush or tint. If too little hydrazine is added, a dark red color is assumed by the mixture, so that it will be apparent that more hydrazine is necessary. Thus a very simple method of controlling the pH is possible by simply watching the color of the reaction mixture.

Bromine imparts a yellowish to brownish tinge or color to the reaction mixture which also provides an easy method of determining the approximate pH of the solution. Other halogens require a testing for pH range to determine the exact amounts and rates of the reactant to give the maximum production of the halogen salts. In most instances, however, mixture of reactants according to the outlined preferred procedure gives proper pH control.

Preferably, the reaction mixture is stirred throughout the reaction. Also, a method of cooling, such as a cooling jacket is preferably applied to the reaction vessel. While this is not critical, it has been found that better results are obtained thereby. For example, in instances where equal amounts of reactants are added, there is a possibility of local generation of heat and gas which can be slowed down through the cooling process.

According to another preferred method of charging the reactants, the metal salt or equivalent can be added to the total amount of water to be used and then the elemental halogen added with stirring. Stirring is then continued while slowly adding the total amount of the hydrazine which is calculated to react with the other reactants. In this instance, a slight excess of halogen is maintained throughout the reaction until the end. Where iodine is being used, the reaction mixture will have a reddish color until the reaction is complete.

If desired, a third method can be employed which involves mixing in the reaction medium for example, water, the hydrazine compound and the halogen and then slowly charging a water dispersion of the metal salt or amine, as above described.

Thus as above described, the reactants of the process can be added to each other in a variety of ways, as long as the pH is controlled within the desired range. Thus, any two of the reactants can be mixed and a third slowly added to it. Incremental amounts or slow streams of all the reactants can be concurrently added with stirring to the reactant vessel. Or, accordingly to a preferred embodiment, incremental amounts of the hydrazine compound and the halogen compound can be added alternately to the metal salt or equivalent in water maintaining a slight excess of the halogen or most preferably of the hydrazine.

A partial list of compounds which can be made according to the process of the invention together with some uses thereof are given in Table 1 below. It will be apparent that hydrates are often produced. These can be made anhydrous if desired, by further heating of the isolated product.

TABLE I

| | |
|---|---|
| LiBr, Low temperature heat Exchange medium | CeF, Optics |
| | CeI, Crystals for infrared Spectroscopy |
| LiCL, Air conditioning | CaBr$_2$, Medicine |
| LiI . 3H$_2$O, Air conditioning | CaCl$_2$, Road Treatment |
| LiF, Welding and Soldering | CaF$_2$, Single pure crystals used in spectroscopy |
| NaCl, Food additive | |
| NaI, Photography | CaI$_2$, Photography |
| NaBr, Photography | SrBr$_2$. 6H$_2$O, Medicine |
| NaF, Fluoridation of water | SrCl$_2$, Pyrotechnics |
| KCl, Fertilizer | SrF$_2$, Medicine |
| KE, Etching glass | SrI$_2$, Medicine |
| KI, Feed supplement, catalyst | BaBr$_2$. 2H$_2$O, Photographic compounds |
| RbCl, Used in analysis to test for perchloric acid | BaCl$_2$. 2H$_2$O, Lube oil additives |
| RbF, Single large crystals | |
| RbI, In Medicine | BaF$_2$, Ceramics |
| RbBr, In Medicine | BaI$_2$. 2H$_2$O, Preparation of other iodides |
| CeBr, Medicine | |
| CeCl, Manufacture of mineral waters | RaBr$_2$, Medicine in cancer treatment |
| RaCl$_2$, Medicine in cancer treatment | HgBr$_2$, Medicine |
| | CuCl or Cu$_2$Cl$_2$, Catalyst Fungicide |
| MgBr$_2$, Medicine | |
| MgCl$_2$, Hydrate | CuI, Medicine, feed additive |
| MgF$_2$, Ceramics | PbI$_2$, Photography |

TABLE I-continued

| | |
|---|---|
| $MgI_2$, & Hydrate, Medicine | $PbF_2$, High temperature Dry Film Lubricant |
| $ZnBr_2$, Medicine | $PbCl_2$, Pigments |
| $ZnCl_2$, Galvanizing iron | $BiI_3$, Analytical chemistry |
| $ZnF_2$, Ceramic glazes | $BiCl_3$, Bismuth salts |
| $ZnI_2$, Medicine | $TaCl_5$, Medicine |
| $CdBr_2$, Photography | $NbCl_5$, Preparation of pure metal |
| $CdCL_2$, Analytical chemistry | |
| $CdF_2$, High temperature dry Film lubricant | $VCl_5$, Medicinal |
| $CdI_2$, Photography | $ZrF_4$, Component in molten salts for nuclear reactors |
| $HgI_2$, Medicine analytical reag. | |
| $HgF_2$, Synthesis of organic Fluorine compounds | $ZrCl_4$, Water repellent for textiles |
| $HgCl_2$, Disinfectant | $YCl_3 . 6H_2O$, Analytical chemistry |
| $FeI_2. 4H_2O$, Medicine | $NH_4I$, Medicine |
| | $NH_4Cl$, Dry batteries |
| $FeF_2 . 8H_2O$, Ceramics | $NH_4F$, Antiseptic in brewing |
| $FeBr_2 . 6H_2O$, Medicine | $NH_4Br$, Fire Retardant |
| $FeCl_2 . 4H_2O$, Mordant | $(-CH_2NH_2)_2 . 2HI$, Feed additive |
| $MnCl_2$ Catalyst | $NiCl_2$, and Hydrate, antiseptic |
| $AlI_3$, Organic synthesis | |
| $AlF_3$, and Hydrate, ceramics | $SnF_2$, Source of F in toothpaste |
| $AlCl_3 . 6H_2O$, Dyestuffs | $SnCl_2$, and Hydrate reducing agent |
| $AlBr_3$, and Hydrate isomerization catalyst | $SnBr_2$, Reducing agent |
| $AgI$, Cloud seeding | $CoI . 6H_2O$, In hygrometers |
| $HyCl$, Photography | $TiCl_4$, Smoke screens |
| $AgBr$, Photography | $AgF . H_2O$, Medicine |
| $CoCl_2 . 6H_2O$, Absorbent F, Ammonia | $CoBr_2 . 6H_2O$, in Hygrometers | de

The invention will be more readily understood by reference to the following examples which are given for the purposes of illustrating the invention and are not intended to constitute a limitation thereof.

EXAMPLES

Calcium iodide is formed by first forming a mixture of 3 kilograms of calcium carbonate and 6 liters of water in an open reaction vessel equipped with a cooling jacket and a propeller type stirrer.

The resulting mixture is stirred continuously during the alternate addition of 7,614 grams of iodine and 1,371.5 grams by weight of a 35% hydrazine hydrate solution in the following manner. A total of 1,500 grams of iodine is added in amounts of 25 grams alternately with a total of 300 grams of hydrazine solution in amounts of 5 grams. At this point, the addition of iodine is continued in amounts of 25 grams until the solution becomes dark red. Then hydrazine is added in approximately equivalent amounts with the iodine until the total amount of the charge has been completed.

Upon completion of the additions, which coincides with the end of the reaction, calcium hydroxide is added to adjust the pH to 8.5. The resulting solution is concentrated by heating to 200° centigrade followed by cooling. The resulting solid which is formed is analyzed to be 83.5% calcium iodide.

EXAMPLE 2

A suitable reaction vessel equipped with a cooling jacket and a propeller type stirrer is charged with 21.2 grams of sodium carbonate and 50.8 grams of iodine in 200 milliliters of water. A 35% by weight hydrazine hydrate solution is added in a slow stream with continuous stirring until the resulting solution is colorless. Approximately 9.14 grams of hydrazine solution is added. The resulting solution is evaporated at 135° C., and allowed to cool overnight. Filtration of the cooled solution produces sodium iodide crystals which are very hygroscopic.

EXAMPLE 3

Lithium iodide is produced by charging a 54.4% by weight solution of hydrazine hydrate in the amount of 29.4 grams to a reaction vessel equipped with a cooling jacket and a propeller type stirrer. An equal volume of water is then added, followed by 84 grams of lithium hydroxide monohydrate.

The resulting mixture is stirred and chilled during the addition of 254 grams of iodine in ten equal portions. After each addition, considerable heat is evolved causing foaming in some instances, upon completion of the addition of the total amount of iodine, the solution is clear and colorless. Evaporation of the final solution at approximately 138° C. followed by cooling produces crystals of lithium iodide trihydrate.

EXAMPLE 4

Barium bromide is produced by adding 197 grams of barium carbonate to 500 milliliters of water in a reaction vessel equipped with a stirrer and a cooling jacket. A 54.4% by weight hydrazine hydrate solution in the amount of 29.4 grams is added with stirring to the barium carbonate and water mixture. Stirring is continued during the drop-wise addition of 160 grams of bromine. Upon the completion of the bromine addition, the solution had a slightly brown color. Two drops of hydrazine solution are added to give a clear, water-white solution. Evaporation of the solution at 135° C., produces crystals of barium bromide dihydrate.

EXAMPLE 5

Substantially the procedure of Example 4 is repeated, using 70.9 grams of chlorine which is bubbled into the barium carbonate hydrazine solution. The resulting solution is concentrated by evaporation at 130° C. to produce crystals of $BaCL_2$.

EXAMPLE 6

Substantially the procedure of Example 5 is repeated, except that 37.8 grams of fluorine gas is bubbled through the hydrazine, barium carbonate reaction mixture. The resulting barium fluoride is produced in amounts comparable to that in Example 5.

EXAMPLE 7

Potassium iodide is produced by following substantially the procedure of Example 1, substituting 4.15 kilograms of potassium carbonate for the calcium carbonate used therein. The results which are obtained are comparable to that obtained in Example 1.

EXAMPLE 8

The procedure of Example 1 is substantially repeated, substituting 8.3 kilograms of silver carbonate in place of the calcium carbonate used in Example 1. A high grade of silver iodide crystals is obtained by following this procedure.

EXAMPLE 9

Substantially the procedure followed in Example 2 is repeated, except that hydrazine sulphate in the amount of 6.6 grams in an equal amount of water is substituted for the hydrazine hydrate used in Example 2. The results are comparable to that obtained in Example 2 ex- cept for the fact that the product contains minor amounts of calcium sulphate.

EXAMPLE 10

Ethylenediamine dihydriodide is formed by charging a reaction vessel which is equipped with a cooling jacket and a propeller type stirrer with 800 millimeters of water and 120 grams of ethylenediamine. Stirring is begun and continued throughout the charging of the reactants.

A water solution of 35% hydrazine hydrate is added in aliquot amounts alternately with iodine. Charging is begun with the hydrazine solution using 9.143 grams per aliquot amount alternating with approximately 45.68 grams of iodine. Additions are continued until a total of 91.43 grams of hydrazine solution has been added and 507.6 grams of iodine has been added. As hydrazine is kept in a slight excess over the amount of the iodine, the reaction solution remains colorless until the last addition of the iodine. At the end of the last iodine addition, the color of the solution is slightly red which is reduced to colorless upon the addition of several drops of hydrazine solution. The reaction mixture is allowed to cool followed by evaporation of the water at a temperature of approximately 125° C. This procedure produces crystals of ethylenediamine dihydriodide of a high quality.

EXAMPLE 11

Substantially the procedure of Example 10 is repeated to produce ammonium iodide using 227 gm. of a 30% by wt. solution of aqua ammonia in place of the ethylenediamine of Example 10. A very pure product is produced according to this method.

EXAMPLE 12

Substantially the procedure of Example 11 is repeated to produce ammonium iodide from ammonium bicarbonate. In this example, 320 grams of ammonium bicarbonate are used in place of the aqua ammonium of Example 11. The other procedures remain the same. Comparable amounts of ammonium iodide are produced by this method, as compared with that of Example 11.

EXAMPLE 13

The procedure of Example 10 is repeated to produce benzylammonium iodide using 428 grams of benzylamine in place of the ethylenediamine of Example 10. A solvent mixture of equal parts of water and dioxane is used in place of the water solvent. Comparable results are obtained according to this procedure.

EXAMPLE 14

Zinc iodide is produced by charging a suitable reaction vessel equipped with a cooling jacket and propeller type stirrer with 400 millimeters of water and 400 millimeters of glycerol. To this solution is then added 507.6 grams of iodine and 91.45 grams of a 35% by weight water solution of hydrazine hydrate. The resulting mixture is stirred during the addition of 162.74 grams of zinc oxide in increments of 16.27 grams. Approximately a minute of stirring is allowed between each incremental addition. Reaction is instantaneous and produces a solution of zinc iodide. After cooling overnight, the solvent mixture is concentrated at approximately 140° C., to produce crystals of zinc iodide hydrate. Further evaporation produces zinc iodide.

EXAMPLE 15

Substantially the procedure of Example 14 is repeated, substituting 141.8 grams of chlorine in place of the iodine and 400 milliliters of methanol in place of the glycerol. The zinc chloride which is produced is of a very high quality.

EXAMPLE 16

The procedure of Example 13 is repeated except that 400 milliliters of dioxane is substituted for the water. Evaporation of the final solution at 100° C. produces benzylammonium iodide of a quality comparable to that produced in Example 14.

The above examples illustrate the versatility of the process of the invention. As described, any two of the reactants may be added together with a third reactant slowly added to the first two. Alternately, simultaneous slow streams of the reactants can be added concurrently. Or, according to the preferred method, incremental amounts of two of the reactants are added alternately to a preferably water solution of the third reactant. According to this last preferred method, one or the other of the reactants is preferably kept in excess throughout the incremental additions.

The above examples are illustrative of the procedures which can be followed to produce the various compounds encompassed by the process of the invention. They are intended to be illustrative only and not to in any way limit the invention. It is contemplated that various modifications of the invention will be apparent to those skilled in the art and may be resorted to without departing from the spirit and scope of the invention as outlined herein and defined by the following appended claims.

I claim:
1. A process for making an amine halide comprising:
   reacting substantially stoichiometric amounts of elemental halogen selected from the group consisting of CL, Br and I;
   a second compound selected from the group consisting of hydrazine, hydrazine hydrate, and compounds which generate hydrazine under the reaction conditions; and,
   a third compound selected from the group consisting of amines and salts thereof which generate the amine under the reaction conditions;
   in a reaction medium selected from the group consisting of water, alcohols, ethers and mixtures thereof.
2. A process for making an amine halide as claimed in claim 1 wherein:
   the pH is kept in the range of about 4.5 to about 7.
3. A process for making an amine halide as claimed in claim 2 wherein:
   the reactants are stirred throughout the reaction.
4. A process for making an amine halide as claimed in claim 3 wherein:
   aliquot amounts of the hydrazine compound are added alternately with slightly smaller aliquot amounts of the halogen to said third compound in said reaction medium.
5. A process for making an amine halide as claimed in claim 3 wherein:
   all of the halogen is charged to said third compound in said reaction medium followed by slowly charging said hydrazine compound.
6. A process for making an amine halide as claimed in claim 3 wherein:

all of said hydrazine compound is charged to said third compound in said reaction medium followed by slowly charging said halogen.

7. A process for making an amine halide as claimed in claim 3 wherein:
said third compound is slowly charged to a mixture of said hydrazine compound and said halogen in said reaction medium.

8. A process for making an amine halide as claimed in claim 2 wherein:
said halogen is iodine, said hydrazine compound is hydrazine hydrate and said reaction medium is water.

9. A process for making an amine iodide as claimed in claim 8 wherein:
said third compound is ethylene diamine and said amine iodide formed is ethylenediamine dihydriodide.

10. A process for making an amine halide as claimed in claim 4 wherein:
said halogen is iodine, said hydrazine compound is hydrazine hydrate and said reaction medium is water.

11. A process for making an amine iodide as claimed in claim 10 wherein:
said third compound is ethylene diamine and the amine iodide formed is ethylenediamine dihydriodide.

12. A process for making an amine halide as claimed in claim 5 wherein:
said third compound is ethylene diamine, said halogen is iodine, said hydrazine compound is hydrazine hydrate, said reaction medium is water and said amine halide produced is ethylenediamine dihydriodide.

* * * * *